United States Patent
Khan (10) Patent No.: US 9,370,904 B2
(45) Date of Patent: Jun. 21, 2016

(54) FLEXIBLE FIBER-REINFORCED COMPOSITE MATERIAL

(71) Applicant: Carbitex, LLC, Kennewick, WA (US)

(72) Inventor: Junus Khan, Kennewick, WA (US)

(73) Assignee: Carbitex, LLC, Kennewick, WA (US)

( * ) Notice: Subject to any disclaimer, the term of this patent is extended or adjusted under 35 U.S.C. 154(b) by 253 days.

(21) Appl. No.: 14/135,384

(22) Filed: Dec. 19, 2013

(65) Prior Publication Data

US 2015/0174885 A1    Jun. 25, 2015

(51) Int. Cl.
*B32B 5/04*    (2006.01)
*B32B 27/04*   (2006.01)
*B32B 27/40*   (2006.01)
*B32B 38/08*   (2006.01)
*B29B 15/12*   (2006.01)
*B29C 70/50*   (2006.01)
*C08J 5/24*    (2006.01)
*D06N 3/14*    (2006.01)
*B32B 38/00*   (2006.01)

(52) U.S. Cl.
CPC ............... *B29C 70/504* (2013.01); *B29B 15/12* (2013.01); *B29B 15/122* (2013.01); *B29B 15/125* (2013.01); *B29C 70/50* (2013.01); *B29C 70/506* (2013.01); *B32B 5/04* (2013.01); *B32B 27/04* (2013.01); *B32B 27/40* (2013.01); *B32B 38/08* (2013.01); *C08J 5/24* (2013.01); *D06N 3/141* (2013.01); *B32B 2038/0076* (2013.01); *B32B 2260/021* (2013.01); *B32B 2260/046* (2013.01); *B32B 2307/54* (2013.01); *B32B 2307/546* (2013.01); *B32B 2307/728* (2013.01); *B32B 2309/02* (2013.01); *B32B 2309/04* (2013.01); *B32B 2375/00* (2013.01)

(58) Field of Classification Search
CPC .......... B32B 5/04; B32B 27/04; B32B 27/40; B32B 38/08; B32B 2038/0076; B32B 2260/021; B32B 2260/046; B32B 2305/72; B32B 2307/54; B32B 2307/546; B32B 2307/728; B32B 2309/02; B32B 2309/04; B32B 2375/00; B29B 15/10; B29B 15/12; B29B 15/122; B29B 15/125; B29C 70/40; B29C 70/50; B29C 70/504; C08J 5/24; D06N 3/14; D06N 3/141; D06N 3/145
See application file for complete search history.

(56) References Cited

U.S. PATENT DOCUMENTS

| | | | | |
|---|---|---|---|---|
| 2,865,891 | A * | 12/1958 | Michel ................ | C08G 63/672 525/408 |
| 2005/0221012 | A1* | 10/2005 | Muehlfeld ............ | C08G 18/12 427/372.2 |
| 2010/0258762 | A1* | 10/2010 | Isobe ................ | C08G 18/0823 252/194 |
| 2013/0059494 | A1* | 3/2013 | Tam ........................ | D01F 6/04 442/59 |

(Continued)

FOREIGN PATENT DOCUMENTS

| | | |
|---|---|---|
| EP | 0645415 A1 | 3/1995 |
| WO | 00/29468 A1 | 5/2000 |
| WO | 2008/077605 A1 | 7/2008 |

(Continued)

*Primary Examiner* — Michael Tolin
(74) *Attorney, Agent, or Firm* — George C. Rondeau, Jr.; Davis Wright Tremaine LLP (57) ABSTRACT

A flexible fiber-reinforced composite material is manufactured by impregnating a fiber reinforcement material with a non-epoxy matrix material. Subsequently, the impregnated fiber reinforcement material is dried and cured, resulting in a flexible fiber-reinforced composite material that exhibits a tensile modulus between 10 MPa and 42 MPa at 20 percent elongation.

6 Claims, 3 Drawing Sheets

(56) References Cited

U.S. PATENT DOCUMENTS

2013/0230716 A1* 9/2013 Schmidt ............ B29C 70/086
                                                    428/339

FOREIGN PATENT DOCUMENTS

| WO | 2011/000646 A1 | 1/2011 |
| WO | 2014/017795 A1 | 1/2014 |

* cited by examiner

FLEXIBLE FIBER-REINFORCED COMPOSITE MATERIAL

FIELD OF THE INVENTION

The present disclosure relates to a composite material comprising various low modulus polymeric matrix resins, combinations of modulus resins, and compositions of fiber-reinforced composite materials for producing cosmetic, non-structural components (e.g., clothing, watch bands, carrying bags, etc.) and structural components for a variety of industries (e.g., aeronautical, automotive, industrial and the like).

DESCRIPTION OF THE RELATED ART

Composite materials reinforced with material fibers (e.g., glass fibers, carbon fibers, basalt, natural fibers, aramid fibers) and cured products of thermosetting resins (e.g., unsaturated polyester resins, vinyl ester resins, epoxy resins, urethanes, phenol resins, cyanate ester resins, bismaleimide resins) have been used extensively in various capacities due to their myriad advantages over metallic structures. These composite materials are lightweight and exhibit mechanical properties conducive to use in various industries as structural components. For instance, these composite materials have been used to manufacture aeronautical and astronautical structural components, automotive structural components, civil and mechanical engineering and construction components, and a variety of sporting goods (e.g., baseball bats, tennis rackets, etc.). Carbon fibers, in particular, provide substantial specific strength and specific elastic moduli which are conducive to use as reinforcing fibers in epoxy resins that exhibit strong adhesion to carbon and are used as matrix resins.

Composite structures generally owe these enhanced mechanical properties to the combination of a matrix and one or more reinforcing structural members. These reinforcing structural members generally determine the majority of the material properties and design versatility, owing to the fact that the reinforcing structural members comprise the majority of the volume of a composite material. For instance, the reinforcement fibers will generally be the principal load bearing component of the composite material. These reinforcing structural members, as mentioned above, may be composed of glass fibers, carbon fibers, basalt and the like. These materials may be introduced in a variety of forms. For instance, carbon fibers may be introduced in a unidirectional tape, weaves, spread tows and non-woven fabrics. These fibers, depending on their configuration, may present varying material properties and may be chosen dependent on the determined application.

The matrix in a composite structure serves to bind the reinforcing structural members together in order to facilitate the transfer of load from one fiber to another during a load bearing application. Composite matrices may additionally serve to protect the underlying reinforcing structural members from abrasion and/or corrosion resulting from use of the composite structure. The composite matrices may also determine certain composite structure material properties. For instance, a composite matrix may determine the compressive strength and transverse mechanical properties for the composite structure. The selection of a matrix material will generally determine the environmental and thermal limitations of the composite material.

Manufacturing of a composite material generally involves using reinforcement fibers that have been impregnated (e.g., saturated or coated) with a resinous material, such as epoxy, which may be used as a matrix to bind the variety of reinforcement fibers. These impregnated materials may be laid up to form a laminate structure and subsequently cured at high temperatures for a specified period of time (dependent upon the materials used) to solidify the composite material. Accordingly, the composite material may be ready for use dependent on the application.

Despite their many advantages, most resin matrix material compositions are generally brittle and have high moduli which reduces the applicability of these materials in flexible applications. For instance, typical cured epoxy systems may have a flexural modulus higher than 40 MPa without the presence of any reinforcement fibers. Additionally, due to their brittleness, unmodified epoxy matrices may be damaged due to impact, which may result in loss of laminate strength. This results in a material that may be ill-suited for certain applications, particularly for cosmetic non-structural components and structural components requiring not only high strength but also high flexibility and toughness.

Additionally, certain epoxy systems, when applied to a reinforcing fiber and cured, may produce an unaesthetic optical quality. For instance, epoxy resins that utilize bisphenol A may exhibit yellowing or hazing upon curing. Additionally, certain epoxy systems are susceptible to changes in optical quality due to ultraviolet (UV) radiation exposure. Thus, these materials are not well suited for aesthetic applications, such as clothing or other accessories that may be desirable to an individual consumer.

Thus, there is a current need in the art to produce a composite material that will allow the composite material to have certain material properties, such as low moduli, that are contrary to the traditional use of high elastic moduli materials. For instance, the low moduli composite material should be manufactured such that the composite material exhibits higher material strength than just the matrix materials or fibers alone. The material mechanical properties of the composite material should exhibit increased toughness, flexibility, and higher elongation behavior than traditional fiber-reinforced composites. The composite material should be robust in order to allow a person skilled in the art to sew, join, or adhere the composite material to other components. Additionally, in order to provide aesthetic appeal, the composite material should exhibit good optical quality and be resistant to UV radiation and light exposure.

SUMMARY OF THE INVENTION

According to the invention, a flexible fiber-reinforced composite material is manufactured by impregnating a fiber reinforcement material with a non-epoxy matrix material, and by drying and curing the impregnated fiber reinforcement material; the dried and cured composite material exhibits a tensile modulus between 10 MPa and 42 MPa at 20 percent elongation.

DETAILED DESCRIPTION OF THE INVENTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the use and manufacture of a flexible fiber-reinforced composite material comprising various low modulus polymeric matrix resins, combinations of modulus resins, and compositions of fiber-reinforced composite materials for use as non-structural and structural components. In an embodiment, the composite material is manufactured by impregnating high elongation, non-epoxy matrix materials with low moduli into a fiber reinforcement material of different types to form solid elastic composites. The composite material, comprising the fiber reinforcement material impregnated with the non-epoxy matrix materials, may exhibit a tensile modulus between 10 MPa and 42 MPa at 20 percent elongation once the composite material has been dried and cured.

As a result of the highly elastic, non-epoxy material (e.g., composite matrix) exhibiting low tensile moduli, the resulting composite material may also exhibit high flexibility and elasticity. Additionally, given the underlying fiber reinforcement, the composite structure may exhibit certain mechanical properties (e.g., tensile strength) conducive to use as structural components in a variety of applications. At the same time, the composite material may exhibit the requisite flexibility, toughness and elasticity along with a low tensile modulus to expand the field of use to other areas, such as fashion, consumer product design and sports equipment, for example.

Due to the polymer systems applied to the reinforcement fibers during the impregnation process and subsequent curing process, the composite material may exhibit good optical quality. This, in turn, may enhance the aesthetic quality of the finished composite material and additionally provide greater environmental survivability. For instance, the composite material may exhibit good optical quality after prolonged exposure to UV radiation and light.

According to a preferred embodiment, a fiber reinforcement material is laminated with a thermoplastic polyurethane film on one side of the fiber reinforcement material. Subsequently, the fiber reinforcement material is coated on the other side with a mixture of a waterborne polyurethane and a hydrophilic polyurethane. This fiber reinforcement material is then cured at 300° F. for ten minutes, resulting in a completed flexible, fiber-reinforced composite material. This resulting fiber-reinforced composite material may exhibit a tensile modulus between 10 MPa and 42 MPa at 20 percent elongation, ideally between 16 MPa and 18 MPa at 20 percent elongation. This flexible fiber-reinforced composite material, because of its relatively low tensile modulus, may be used in applications requiring repelling of water (e.g., rain, snow, etc.), as well as breathability (e.g., transmission of sweat away from a person, etc.) and wearability. Thus, this flexible fiber-reinforced composite material may be used for soft luggage, personal apparel and other wearable articles.

According to another preferred embodiment, a fiber reinforcement material is fully impregnated with a mixture of a waterborne polyurethane and a polyether siloxane copolymer by working the mixture into the fiber reinforcement material. The fully impregnated material is subsequently cured at a temperature of 200° F. for twenty minutes. The resulting fiber-reinforced composite material may exhibit a tensile modulus between 10 MPa and 40 MPa at 20 percent elongation, ideally between 25 MPa and 27 MPa at 20 percent elongation. Because of the higher tensile modulus exhibited by this fiber-reinforced composite material, this material may be used in applications requiring a measure of flexibility but also added durability. For instance, this fiber-reinforced composite material may be used to manufacture belts, straps, interior decorating coverings, watch straps, electronic coverings, sporting equipment and the like.

According to yet another preferred embodiment, a fiber reinforcement material is fully impregnated with a mixture of a hydrophilic polyurethane and water. Subsequently, the fiber reinforcement material is cured at a temperature of 300° F. for ten minutes. Upon curing, the fiber reinforcement material is then laminated with a thermoplastic polyurethane on one side of the material. The completed flexible fiber-reinforced composite may exhibit a tensile modulus between 10 MPa and 42 MPa at 20 percent elongation, ideally between 38 MPa and 41 MPa at 20 percent elongation. Due to the higher tensile modulus that this flexible fiber-reinforced composite material may exhibit, this material may be used in conjunction with other material systems to provide strength and vibration dampening in wind turbine blades and other applications requiring additional strength and flexibility (e.g., aerodynamic applications, etc.).

According to another preferred embodiment, a fiber reinforcement material is partially impregnated (up to 99 percent impregnation) on one side with a liquid silicone rubber and cured at 300° F. for thirty minutes. Subsequently, the fiber reinforcement material is impregnated, on the opposite side, with a mixture of a waterborne polyurethane and a hydrophilic polyurethane and cured at 300° F. for ten minutes. The cured flexible fiber-reinforcement material may exhibit a tensile modulus between 10 MPa and 42 MPa at 20 percent elongation, ideally between 10 MPa and 17 MPa. This flexible, fiber-reinforced composite material may be used in applications requiring greater flexibility. Thus, this material may be also be used to manufacture soft luggage, apparel, footwear and other wearable articles.

In an embodiment, to manufacture the flexible fiber-reinforced composite material, a fiber reinforcement material is saturated with a non-epoxy matrix material through a dip/squeeze saturator. Subsequently, the saturated material is removed from the dip/squeeze saturator in order to air dry and cure the composite material according to the desired flexibility and material properties.

In an embodiment, the flexible fiber-reinforced composite material is manufactured by introducing a fiber reinforcement material to a size press to apply a non-epoxy material to one side of the fiber reinforcement material and applying a different non-epoxy material to the opposite side of the fiber reinforcement material. The fiber reinforcement material may be dried and cured upon application of a non-epoxy matrix material to one side of the fiber reinforcement material through the size press and, subsequent to drying and curing the fiber reinforcement material, apply a second non-epoxy matrix material to the opposite side of the fiber reinforcement material utilizing the size press or an alternative manufacturing method. This may provide a manufacturer with greater flexibility to select one or more non-epoxy matrix materials for the composite material and produce a composite material with desired material properties.

In this manner, a flexible fiber-reinforced composite material is manufactured that can be used in numerous applications requiring greater flexibility and elongation, as well as significant tensile strength. In addition, the flexible fiber-reinforced composite material described and suggested herein facilitates additional technical advantages. For example, because, in some embodiments, the flexible fiber-reinforced composite material is coated with one or more additives, the finished flexible fiber-reinforced composite material may exhibit greater scratch resistance and reduced surface irregularities. This, in turn, may improve the durability of the flexible fiber-reinforced composite material, which may enable a manufacturer to utilize this composite material in a greater range of applications.

Fiber Materials

As noted above, fiber-reinforcement materials may be used in a composite material to provide substantial strength and stiffness. These fiber-reinforcement materials may generally comprise the bulk of the composite material mechanical properties, owing to the fact that these fiber-reinforcement materials may comprise the majority of the composite volume. The fibers may be comprised of any suitable material, designed to provide the desired material properties for the finished composite material. For instance, depending on the application, a manufacturer may select from carbon fiber compositions, polymer fibers (e.g., aramid, polyethylene, polyester and others) or natural fibers (e.g., kenaf, hemp, rice straw, flax, coir and others) to provide a specified set of material properties best suited for the application.

In an embodiment, the underlying fiber reinforcement material is comprised of a carbon fiber fabric. For instance, the carbon fiber fabric may be used as a fiber reinforcement material such that the material may receive a suitable matrix material, as described in detail below. Table 1 shows a preferred fiber reinforcement material that may be used to manufacture the flexible fiber-reinforced composite material.

TABLE 1

| | Fiber Reinforcement Material |
|---|---|
| Tensile Properties | |
| Ultimate Elongation (%) | 1.9 |
| Ultimate Tensile Strength (ksi) | 1160 |
| Tensile Modulus (Msi) | 34 |
| Other Properties | |
| Density (lb/in$^3$) | 0.065 |
| Filament Diameter (μm) | 7 |
| Filaments | 3000 |

It should be noted that while carbon fiber fabrics, such as the carbon fiber fabric comprising properties as those in Table 1, are used extensively throughout the present disclosure for the purpose of illustration, the underlying fiber reinforcement material may be comprised of other suitable materials. As noted above, varying polymer fiber materials may be available, such as aramid (e.g., Kevlar®), polyethylene, and the like. Alternatively, a manufacturer may select from one or more available natural fibers (e.g., kenaf, hemp, rice straw, flax, coir and others) for various applications. Additionally, a manufacturer may use a different form of carbon fiber as a fiber reinforcement material. For instance, instead of a carbon fiber fabric, a manufacturer may select unidirectional carbon fiber plies to generate a lamina that, when impregnated with a non-epoxy material, exhibits the desired material properties for the flexible fiber-reinforced composite material.

Matrix Materials

As noted above, the composite material may be manufactured by impregnating high elongation, non-epoxy materials with low moduli into fiber-reinforcement material of different forms to form solid elastic composites. These non-epoxy materials may comprise the matrix of the composite. Non-epoxy materials that may be used include aqueous dispersions, thermoplastic films, hot-melts, solvent-based dispersions, and thermosetting elastomers via single or multi-component cure systems. For instance, various aqueous dispersions are commercially available which may be impregnated into various fiber materials to create the composite material. For instance, an example of an available aqueous dispersion is an aliphatic polyether waterborne polyurethane dispersion. Another example of a commercially available aqueous dispersion that may be used is a hydrophilic polyurethane dispersion. These aqueous dispersions may be combined with other additives to provide other composite material characteristics to the finished product. For example, in an embodiment, an aqueous dispersion is used with a polyether siloxane copolymer to provide greater scratch resistance and prevent cratering during the manufacturing process. Table 2 shows preferred aqueous dispersions and additives that may be used, alone or in combination, as a matrix material for manufacturing the flexible fiber-reinforced composite material.

TABLE 2

| Name | Viscosity (mPa · s), 25° C. |
|---|---|
| Aliphatic Polyether Waterborne Polyurethane Dispersions | |
| Waterborne Polyurethane | 1000 |
| Hydrophilic Polyurethane | <1500 |
| Polyether Additives | |
| Polyether Siloxane Copolymer | 1850 |

As will be described in greater detail below, these aqueous dispersions may be used to fully impregnate a fiber reinforcement material fabric to provide desired material properties to the finished flexible fiber-reinforced composite material. Additionally, these aqueous dispersions may be used to coat the fiber reinforcement fabric after the fabric has been laminated or partially impregnated on one side of the fabric. The fiber reinforcement material may also be immersed in an aqueous dispersion to provide a finish coating to the finished composite material. For instance, the finish coating may be introduced for various performance or aesthetic requirements (e.g., water resistance, abrasion resistance, etc.).

Prior to coating the fiber-reinforcement material with the above mentioned aqueous dispersions, the composite material reinforcement fibers may be laminated with thermoplastic elastomers or partially impregnated with an elastomeric silicone emulsion or a liquid silicone rubber paste. For instance, in an embodiment, the composite reinforcement fibers are laminated on one side with a thermoplastic polyurethane film, such as an aliphatic polyether polyurethane film or an aromatic polyether polyurethane. The use of a polyether polyurethane may provide certain benefits in the application of the flexible fiber-reinforced composite material. For instance, polyethers may be resistant to water and high humidity, which may be preferred in certain applications (e.g., clothing such as raincoats and jackets and structural components exposed to locations with high humidity or adverse weather conditions). Additionally, polyethers may also provide certain levels of hydrolytic stability, thus providing added durability in the presence of water. Table 3 shows two preferred thermoplastic elastomer laminations that may be used to manufacture the flexible fiber-reinforced composite material.

TABLE 3

|  | Aliphatic Polyether Polyurethane | Aromatic Polyether Polyurethane |
|---|---|---|
| Tensile Properties | | |
| Ultimate Elongation (%) | 400 | 660 |
| Ultimate Tensile Strength (psi) | 10500 | 5080 |
| 100% Modulus (psi) | 1600 | 725 |
| 300% Modulus (psi) | 5900 | 1100 |
| Other Properties | | |
| Tear Resistance (pli) | 350 | 430 |

Alternatively, the composite fibers may be partially impregnated with an elastomeric silicone softener micro emulsion or a liquid silicone rubber paste. The selection of a silicone-based application may depend upon the material properties desired in the final flexible fiber-reinforced composite material. For instance, in an embodiment, an elastomeric silicone softener micro emulsion is applied to the fiber reinforcement materials or other textile auxiliaries to impart elastomeric properties to the finished product. Accordingly, the use of such elastomeric silicone softeners may improve the elasticity and durability of apparel comprised of a flexible fiber-reinforced composite material.

Liquid silicone rubber applications may be used to enhance the mechanical and electrical properties of the other components to which the liquid silicone rubber applications are applied. For example, these applications may be applied to the fiber reinforcement materials to create a variety of products, such as automotive or aeronautical components. Table 4 shows a preferred liquid silicone rubber application that may be used to manufacture the flexible fiber-reinforced composite material.

TABLE 4

|  | Liquid Silicone Rubber |
|---|---|
| Tensile Properties | |
| Ultimate Elongation (%) | 860 |
| Ultimate Tensile Strength (psi) | 1160 |
| Viscosity | |
| Viscosity (Shear Rate 0.9 s$^{-1}$) (mPa · s) | 280000 |
| Viscosity (Shear Rate 10 s$^{-1}$) (mPa · s) | 180000 |
| Other Properties | |
| Tear Resistance (pli) | 148 |

As will be described below, the elastomeric silicone softener micro emulsion or the liquid silicone rubber paste may be applied to one side of the fiber reinforcement material fabric (e.g., partial impregnation of the fabric) and subsequently air dried and cured. Once this step has been completed, the other side of the material fabric may be coated or impregnated with a second matrix material to a certain depth into the fabric, depending upon the desired final product. Again, the fabric may be air dried and cured to complete the manufacturing process.

Manufacturing Techniques

The flexible fiber-reinforced composite material may be manufactured using various distinct treatments dependent upon the types of materials used. Some common methods of introducing these different treatments include dip coating, doctor blading, drum rolling and belt laminating, among others. The various polymer systems may be applied to the reinforcement fiber form chosen and impregnated either fully or partially into the fiber form depending upon whether the laminate structure is a single or a multi-laminate polymer matrix structure. For instance, pre-impregnation systems for applying epoxy resins and unsaturated polymer systems may be configured to use wet dispersion systems or single/multi-component thermosetting elastomers to impregnate a fiber web.

Figure 1:
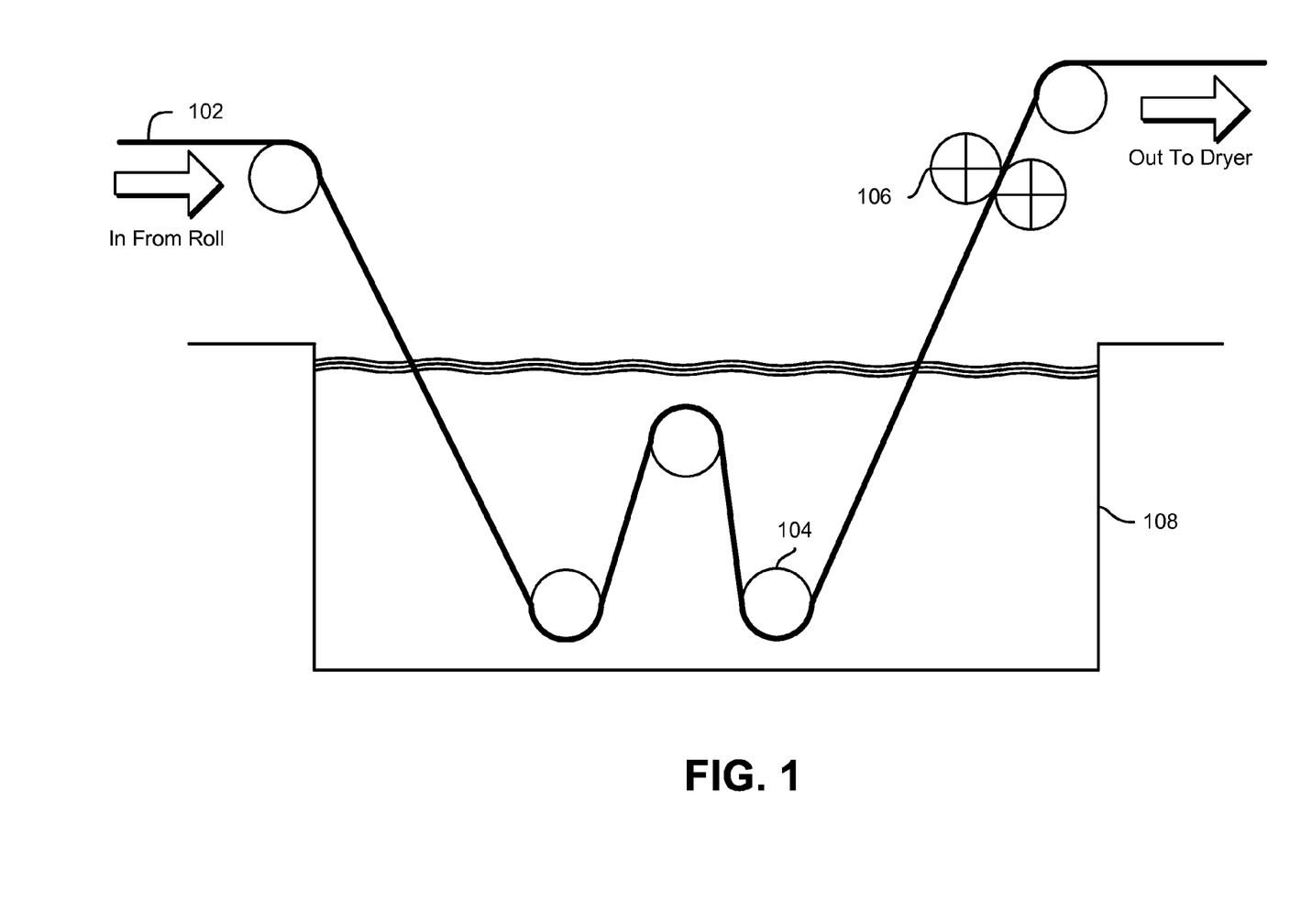
FIG. 1 is an illustrative example of a dip/squeeze saturator for manufacturing a flexible fiber-reinforced composite material in accordance with at least one embodiment.

For example, if the reinforcement fiber is to be infused completely with an aqueous dispersion, a manufacturer may use a dip/squeeze saturator as illustrated in FIG. 1. A fiber reinforcement fabric 102 may be introduced to the dip/squeeze saturator from, for instance, as a roll comprising the fabric. This fiber reinforcement fabric may be immersed in a polymer system bath 108 and may be saturated through the use of one or more dip rolls 104 within the polymer system bath. The saturated reinforcement fabric 102 may be processed through one or more nip rolls 106 in order to remove any excess aqueous dispersion (e.g., matrix material). Subsequently, the saturated reinforcement fabric 102 may be removed from the dip/squeeze saturator in order to air dry and cure the composite material according to the desired flexibility and material properties desired. Other methods may be used to completely infuse the reinforcement fiber with an aqueous dispersion. For instance, a manufacturer may select a low viscosity matrix material and apply the matrix material using a brush, roller or similar applicator.

Once the fully impregnated reinforcement fiber (e.g., fabric) has been removed from the dip/squeeze saturator, the fully impregnated reinforcement fiber may be air dried and cured at a certain temperature. For example, in an embodiment, the fiber reinforcement material fabric may be fully impregnated with a combination of an aliphatic polyether waterborne polyurethane dispersion and water (preferably at a seven to two ratio) and subsequently cured at 300° F. for ten minutes. Alternatively, a manufacturer may use a combination of an aliphatic polyether waterborne polyurethane dispersion with one or more additives to fully impregnate a fiber reinforcement material fabric and cure this composite material at 200° F. for twenty minutes. It should be noted that the present disclosure is not limited to the combinations presented above and, as such, other possible combinations are incorporated that may produce the material properties listed below. Additionally, a manufacturer may use a variety of different cure temperatures and times to achieve the desired material properties.

Figure 2:
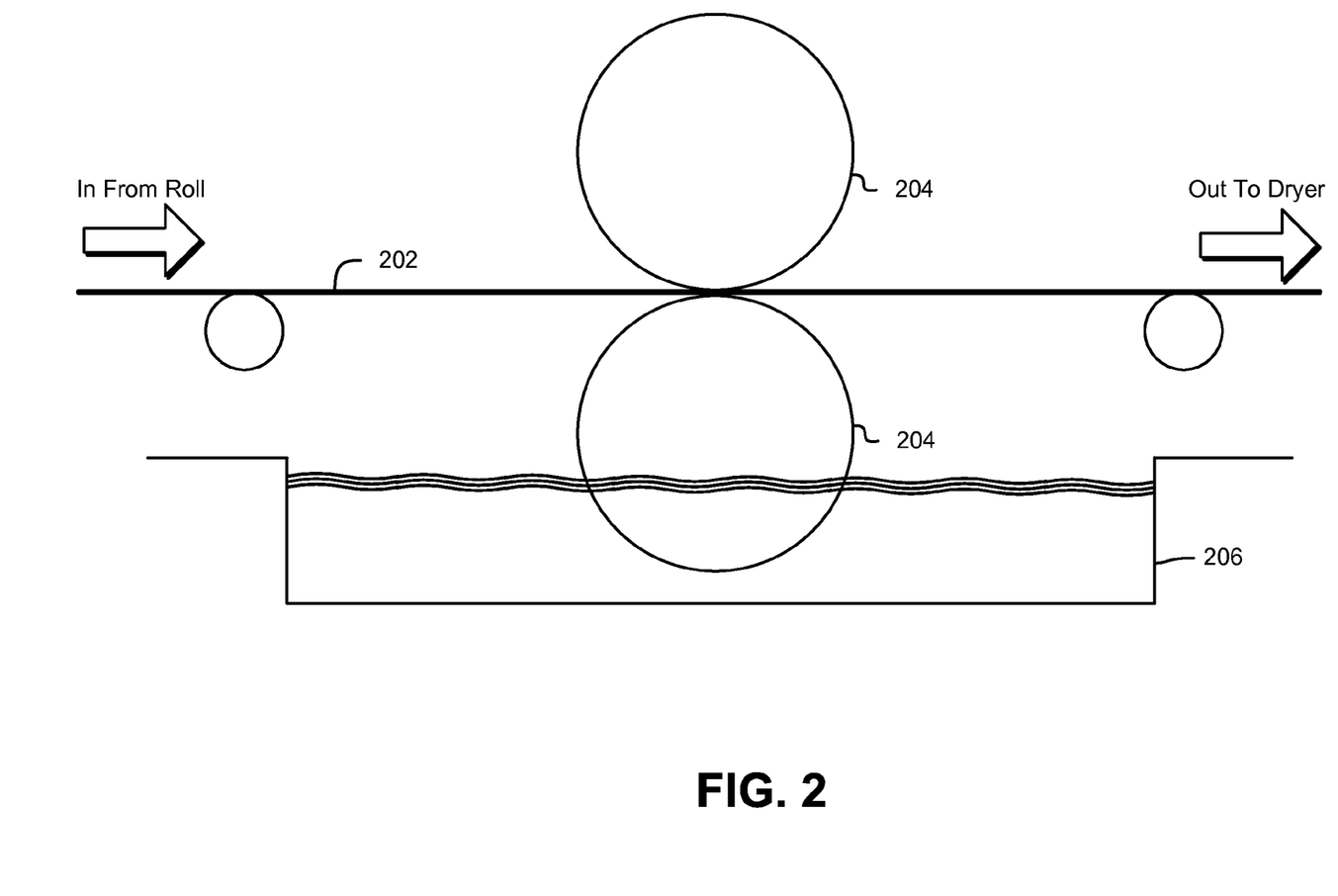
FIG. 2 is an illustrative example of a size press saturator for manufacturing a flexible fiber-reinforced composite material in accordance with at least one embodiment.

Alternatively, if the finished flexible fiber-reinforced composite material is to be manufactured such that different matrix materials are included on opposing sides of the composite material, a manufacturer may utilize different manufacturing methods to create this final product. For instance, as illustrated in FIG. 2, a manufacturer may use a size press to apply a matrix material on one side of a fiber reinforcement fabric 202. In the size press illustrated in FIG. 2, the fiber reinforcement fabric 202 may be processed through one or more press rolls 204 in order to introduce an aqueous dispersion or other liquid, gel or hot melt material that may serve as a matrix to the fabric. The press roll 204 may be immersed in a polymer system bath 206 such that the press roll includes a layer of the matrix material that is to be used to partially impregnate the fiber reinforcement material fabric. Accordingly, as the fabric 202 passes through the rotating press rolls 204, a lower surface of the fabric may be impregnated with the matrix material included on the press roll immersed in the polymer system bath 206. The partially impregnated fabric 202 may then be removed from the size press, air dried and cured according to the desired flexibility and material properties. If a manufacturer desires to create a multi-laminate material (e.g., one side of the fiber reinforcement material fabric is coated or impregnated with one form of matrix and the opposite side is coated or impregnated with an alternative matrix), the manufacturer may then process the partially impregnated fabric 202 through any of the other manufacturing techniques described in the present disclosure to impregnate the other side of the fabric.

For example, in an embodiment, one side of the fiber reinforcement material fabric is partially impregnated with a silicone-based application, such as the silicone-based application described above in connection with Table 4. The partially impregnated fabric is then cured at 300° F. for thirty minutes prior to impregnating the opposite side of the material with another matrix material (e.g., waterborne polyurethane, hydrophilic polyurethane, etc.). Subsequently, the fabric is once again cured at 300° F. for ten minutes to complete the manufacture of the flexible fiber-reinforced composite material. While the present disclosure uses liquid silicone rubber, waterborne polyurethane and hydrophilic polyurethane for the purpose of illustration, the scope of the disclosure is not so limited. For instance, a manufacturer may use any satisfactory aliphatic polyether waterborne polyurethane dispersions with silicone-based applications or other additives to achieve the material properties illustrated below. Additionally, a manufacturer may use a variety of different cure temperatures and times to achieve the desired material properties.

Figure 3:
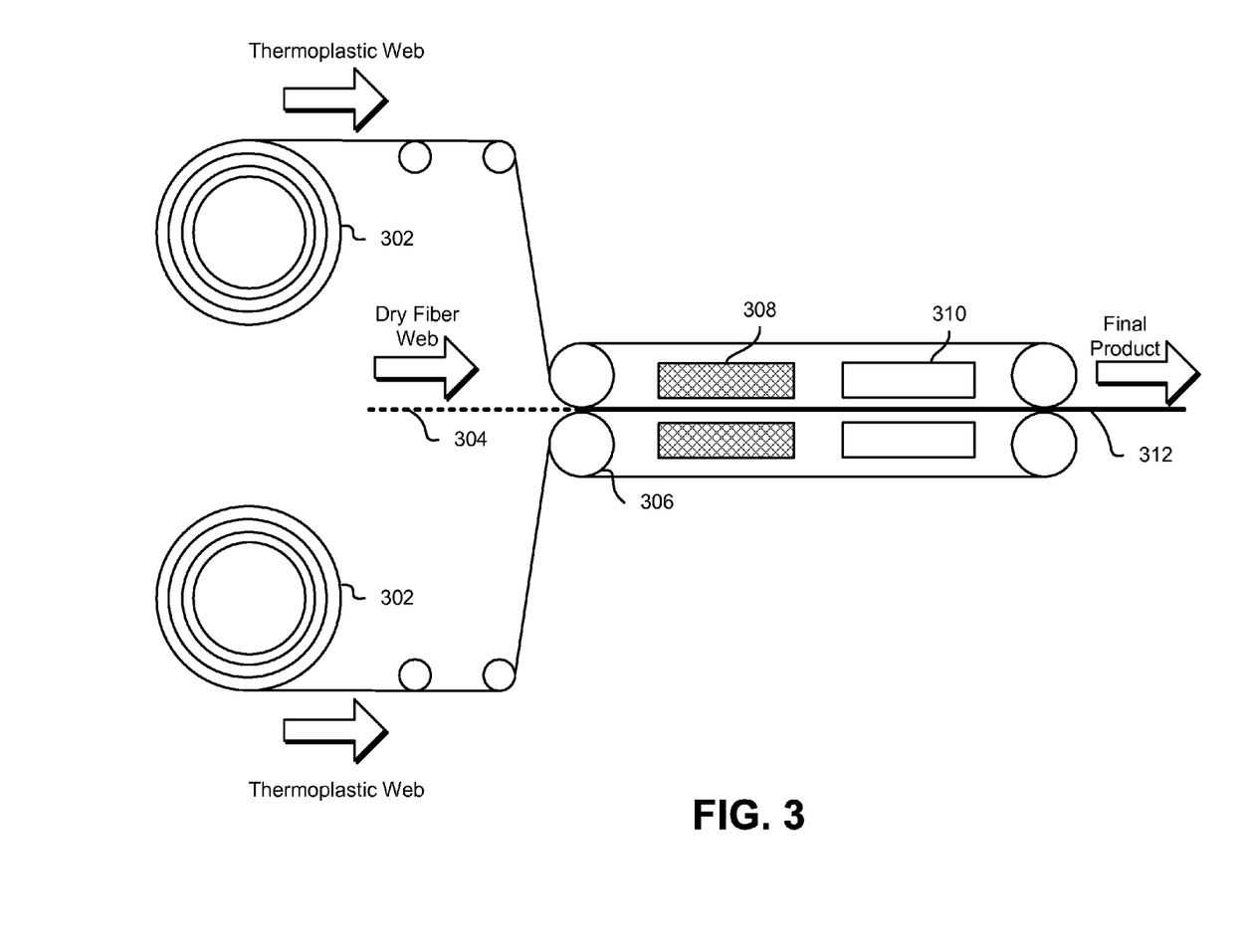
FIG. 3 is an illustrative example of using a belt press for impregnating hot film laminations in accordance with at least one embodiment.

Other types of impregnating systems may be used to apply a matrix material to a fiber reinforcement material fabric. For instance, as illustrated in FIG. 3, a laminating press 306 may be used to apply hot film laminations to a dry fiber web 304 to create a completed product. In such impregnating systems, a thermoplastic web 302 may be introduced and pressed onto either side of a dry fiber web 304 using a laminating press 306. Subsequently, the laminating press 306 may move the dry fiber web 304 and the thermoplastic web 302 through a heating unit 308 to impregnate the dry fiber web. This newly impregnated composite may then be processed through a cooling unit 310 to generate the final laminated product 312.

For example, if a manufacturer uses an aliphatic polyether polyurethane film for creating a flexible fiber-reinforced composite material, the manufacturer may introduce the film through the use of a laminating press. The aliphatic polyether polyurethane film may be introduced in a similar manner as the thermoplastic web illustrated above and pressed against the fiber reinforcement material fabric. Subsequently, the film may be heated (e.g., via infrared lamps in a tunnel or a similar heating unit as illustrated in FIG. 3) to an appropriate melting temperature such that the film may be impregnated into the fabric. Accordingly, the fabric and film may pass through pressurized rollers to fuse the two layers together. The pressure applied to the fabric and film may be adjusted to control the amount of impregnation of the film into the fabric. The fabric/film combination may then be cooled, such as by processing through a cooling unit. At this point, a manufacturer may apply additional coatings or additives to the fabric/film to create the flexible fiber-reinforced composite material.

The manufacturing techniques above may be used in any combination to produce the flexible fiber-reinforced composite material. For example, for a multi-laminate material, one side of a fiber reinforcement material fabric may be processed through a size press (as illustrated in FIG. 2) or a laminating press (as illustrated in FIG. 3) to apply an aqueous dispersion, aliphatic polyether polyurethane film, or some other matrix material to one side of the fabric. The fabric may then be air dried at room temperature or up to 212° F. and then cured at a temperature dependent upon the level of saturation and matrix system to be applied. Once cured, the reverse side of the fabric may be coated or impregnated with a second matrix material to a desired depth into the fabric. Again, a size press or laminating press may be used to introduce this second matrix material. Alternatively, the fabric may be fully immersed in a polymeric system bath (as illustrated in FIG. 1) to impregnate the remaining fabric material with this second matrix material. Accordingly, the fabric and second matrix material may be air dried and cured, depending upon the second matrix system applied and the desired level of saturation.

It should be noted that while the use of a laminating presses, size presses, and dip/squeeze saturators are used throughout the present disclosure for the purpose of illustration, other manufacturing techniques may be used to apply the various matrix systems that may be used to create the flexible fiber-reinforced composite material. For instance, a rotogravure process may be used to coat a liquid, gel or hot melt material and then fuse the material with the fiber reinforcement material fabric. Alternatively, a manufacturer may use a die slot coating process to coat the fabric whereby the matrix material may be introduced through a slot coating die.

Production of Flexible Fiber-Reinforced Composite Materials

Flexible fiber-reinforced composite materials were produced by impregnating a fiber reinforcement material fabric with one or more of the non-epoxy matrix material combinations described above and curing the impregnated fiber-reinforcement material for a time and at a temperature based at least upon the non-epoxy matrix materials selected and the material properties sought after. For instance, one layer of carbon fiber fabric was fully impregnated with a mixture of a hydrophilic polyurethane dispersion and water and cured at 300° F. for ten minutes and subsequently laminated with thermoplastic polyurethane film on one side. In another instance, one layer of carbon fiber fabric was laminated with a thermoplastic polyurethane film on one side and subsequently the laminated fiber fabric was coated, on the side without the lamination, with a mixture of a hydrophilic polyurethane dispersion and a waterborne polyurethane dispersion. This composite material was cured at 300° F. for ten minutes to create the finished composite material. In yet another instance, one layer of carbon fiber fabric was fully impregnated with a mixture of a waterborne polyurethane dispersion and a polyether siloxane copolymer using a roller and working the mixture into the carbon fiber fabric. This composite material was cured at 200° F. for twenty minutes to create the finished composite material. In a final instance, one layer of carbon fiber fabric was partially impregnated with a liquid silicone rubber application, as described above, and cured at 300° F. for thirty minutes. Subsequently, the other side of the carbon fiber fabric was impregnated with a mixture of a hydrophilic polyurethane dispersion and a waterborne polyurethane dispersion and cured at 300° F. for ten minutes to produce the completed flexible fiber-reinforced composite material.

Samples of each of the flexible fiber-reinforced composite materials produced were analyzed in order to determine the material properties for each composite material and accordingly determine whether the composite material satisfied criteria for use. In each analysis, a 4 in. by 1 in. sample was obtained for each of the composite materials produced and placed in an MTS® Sintech 1/G test frame for determination of tensile properties for each sample. Each sample was tested by applying a tensile force on the sample such that the composite was elongated at a rate of 0.5 inches per minute until material failure. The analysis method described above comports with the method set forth by American Society for Testing and Materials (ASTM) International in a standard entitled "Standard Test Method for Tensile Properties of Polymer Matrix Composite Materials," designated D 3039/D 3039M by ASTM International.

The results of the measurements and calculations are summarized below in Table 5. Material 90-1 comprises a fiber reinforcement material laminated on one side with a thermoplastic polyurethane and coated, on the side without the lamination, with a mixture of a hydrophilic polyurethane dispersion and a waterborne polyurethane dispersion. Material 90-1 was subsequently cured at 300° F. for ten minutes. Sample 90-2 comprises a fiber-reinforcement material fully impregnated with a mixture of a waterborne polyurethane dispersion and a polyether siloxane copolymer and cured at 200° F. for twenty minutes. Material 90-3 comprises a fiber-reinforcement material fully impregnated in a mixture of a hydrophilic polyurethane dispersion and water and cured at 300° F. for ten minutes and subsequently laminated with thermoplastic polyurethane film on one side. Lastly, Material 90-4 comprises a fiber-reinforcement material partially (up to 99%) impregnated, on one side, with a liquid silicone rubber and cured at 300° F. for thirty minutes. Subsequently, Material 90-4 was impregnated, on the opposite side, with a mixture of a hydrophilic polyurethane dispersion and a waterborne polyurethane dispersion and cured at 300° F. for ten minutes. For each material, three samples were created in order to obtain an average set of material properties. Thus, the results summarized below in Table 5 are illustrative of an average set of material properties for the four different embodiments of the flexible fiber-reinforced composite material.

TABLE 5

| Material | Ultimate Tensile Strength (MPa) | Percent Elongation (%) | Tensile Modulus at 20% Elongation (MPa) |
| --- | --- | --- | --- |
| 90-1 | 46.82 | 63.44 | 17.44 |
| 90-2 | 20.84 | 40.49 | 26.23 |
| 90-3 | 31.60 | 68.96 | 39.83 |
| 90-4 | 17.06 | 40.95 | 13.00 |

The resulting flexible fiber-reinforced composite materials, as illustrated in Table 5, each demonstrate significant elongation prior to material failure with sufficiently low tensile modulus to be useful in a variety of applications requiring flexibility and durability at the same time. As noted above, these flexible fiber-reinforced composite materials may be used for applications ranging from soft luggage and wearable articles to sporting equipment and lamination for wind turbine blades.

What is claimed is:

1. A method of manufacturing a flexible fiber-reinforced composite material comprising:
   laminating one side of a fiber fabric reinforcement material with a thermoplastic polyurethane film;
   after laminating the one side of the fiber fabric reinforcement material with the thermoplastic polyurethane film, impregnating the fiber fabric reinforcement material with a non-epoxy matrix material, the non-epoxy material comprising a mixture of a hydrophilic polyurethane dispersion and a waterborne polyurethane dispersion; and
   curing the impregnated fiber fabric reinforcement material, the cured impregnated fiber fabric reinforcement material exhibiting a tensile modulus between 10 MPa and 42 MPa when a sample of the cured impregnated fiber fabric reinforcement material, measuring four inches in length and one inch in width, is elongated, longitudinally, by 20 percent of the length of the sample.

2. The method of claim 1, wherein curing the impregnated fiber fabric reinforcement material includes curing the impregnated fiber fabric reinforcement material at a temperature of 300° F. for at least ten minutes.

3. The method of claim 2, wherein the cured impregnated fiber reinforcement material exhibits a tensile modulus between 16 MPa and 18 MPa.

4. The method of claim 1, wherein the fiber fabric reinforcement material is comprised of carbon, glass, aramid, polyethylene, kenaf, hemp, rice straw, flax, or coir fiber.

5. The method of claim 1, wherein the method further comprises processing the fiber fabric reinforcement material through one or more press rolls to impregnate the fiber fabric reinforcement material with the non-epoxy matrix material.

6. The method of claim 1, wherein the method further comprises introducing the fiber fabric reinforcement material and the thermoplastic polyurethane film to a laminating press to laminate the thermoplastic polyurethane film onto the one side of the fiber fabric reinforcement material.

* * * * *